United States Patent [19]
Sho et al.

[11] Patent Number: 5,643,977
[45] Date of Patent: Jul. 1, 1997

[54] ROOM-TEMPERATURE CURABLE WATERBASED COATING COMPOSITIONS

[75] Inventors: Katsuhiko Sho, Mino; Masahiro Nishio, Kadoma; Koichi Saitoh, Kyoto; Kei Aoki, Ikoma; Tohru Yagi, Kyoto, all of Japan

[73] Assignee: Nippon Paint Co., Ltd., Osaka, Japan

[21] Appl. No.: 512,488

[22] Filed: Aug. 8, 1995

[30] Foreign Application Priority Data

Aug. 9, 1994 [JP] Japan ................................ 6-209208

[51] Int. Cl.$^6$ ................................................ C08K 3/20
[52] U.S. Cl. .................... 523/411; 523/408; 523/413; 523/412; 525/301; 525/302
[58] Field of Search ........................ 523/411, 408, 523/412, 413; 525/301, 302

[56] References Cited

U.S. PATENT DOCUMENTS

| | | | |
|---|---|---|---|
| 4,408,018 | 10/1983 | Bartmann et al. | 525/300 |
| 5,416,136 | 5/1995 | Konzmann et al. | 523/414 |
| 5,439,952 | 8/1995 | Lum et al. | 523/410 |

*Primary Examiner*—Melvyn I. Marquis
*Assistant Examiner*—Randy Gulakowski
*Attorney, Agent, or Firm*—Millen, White, Zelane, & Branigan, P.C.

[57] ABSTRACT

A water-based coating composition which cures through a Michael reaction at room temperature is provided. The composition comprises (a) an aqueous emulsion of an acrylic copolymer having a plurality of activated methylene groups in the molecule, (b) an aqueous dispersion or solution of a compound having a plurality of ethylenic unsaturations in the molecule, and (c) a compound capable of catalyzing the Michael reaction.

12 Claims, No Drawings

ROOM-TEMPERATURE CURABLE WATERBASED COATING COMPOSITIONS

FIELD OF THE INVENTION

This invention relates to a water-based coating composition which produces a cured film at room temperature through a Michael reaction.

BACKGROUND OF THE INVENTION

Much interest has been placed today on water-based paints for reducing the emission of VOC to the environment. Air drying water-based paints of emulsion type are now in wide use. These emulsion type paints rely, as their film-forming mechanism, on physical cohesion or physical fusion of emulsion particles upon evaporation of water. However, the performance of their films such as water-resistant, solvent-resistant and anti-chemical properties is not satisfactory compared to the films produced from thermosetting coating compositions. Room-temperature curable coating compositions containing an external crosslinker such as polyisocyanate crosslinkers must be provided as a two-part composition particularly when high crosslinking densities are desired. This is because once mixed the composition can no longer be stored for a long period of time.

A reaction known as the Michael reaction in which an activated methylene group is added to a polarized carbon-to-carbon double bond such as α,β-unsaturated carbonyl has been employed as a crosslinking mechanism of coating compositions. These compositions are advantageous in that the crosslinking reaction proceeds without forming any reaction by-product and newly formed crosslinking bonds are chemically stable carbon-to-carbon bonds. These type of compositions are also not stable upon long-term storage when formulated in a one-pot composition. This is particularly true when the composition contains a base which catalyzes the Michael reaction. Conversely, if the compositions could be formulated in a storage-stable, one-pot composition, they would require an elevated temperature at least above 100° C. or a long period of time for baking. For example, U.S. Pat. No. 4,408,018 discloses a room-temperature curable composition containing an acrylic polymer having a plurality of pendant acetoacetate groups, a crosslinker such as trimethylolpropane triacrylate and a basic catalyst. This composition is not stable upon long term storage when all reactants are mixed together. JP-A-05247372 (Laid Open No. 247372/93) discloses a one-pot composition containing a binder resin having a plurality of α, β-unsaturated carbonyl groups and an activated methylene crosslinker. This composition does not contain a catalyst and is stable upon storage. However, its baking requires an elevated temperature higher than 100° C. EP-A-596461 discloses a water-based coating composition utilizing as its curing mechanism a Michael reaction. Although it is taught that the composition may be cured at a relatively low temperature, for example, at 60° C., at least one of the Michael reactants or catalyst must be kept separate from the remainder of the composition until immediately before use.

A crosslinkable coating composition is known which utilizes a reaction between carbonyl and hydrazide groups. For example, JP-A-02155956 (Laid Open No. 155956/90) discloses a coating composition comprising an emulsion of an acrylic copolymer having a plurality of carbonyl groups and a polyhydrazide crosslinker. This composition also has a limited storage stability particularly when a high crosslinking density is desired, and film properties, particularly acid resistance are not satisfactory because the newly formed crosslinking bond is a Schiff base type carbon-to-nitrogen bond.

A need exists, therefore, for a one-pot water-based coating composition which cures through a Michael reaction at room temperature yet retaining a satisfactory storage stability and gives a film having excellent properties.

SUMMARY OF THE INVENTION

The present invention meets the above need and provides a water-based room-temperature curable coating composition comprising (a) an aqueous emulsion of an acrylic copolymer having a plurality of activated methylene groups in the molecule, (b) an aqueous dispersion of a compound having a plurality of ethylenic unsaturations in the molecule, and (c) a compound capable of catalyzing the Michael reaction.

PREFERRED EMBODIMENTS OF THE INVENTION

Component (a)

Acrylic resins having a plurality of activated methylene groups may be produced by copolymerizing an acrylic monomer having an activated methylene group such as 2-acetoacetoxyethyl (meth)acrylate, 2-cyanoacetoxyethyl (meth)acrylate, N-(2-cyanoacetoxyethyl)acrylamide, N-(2-propionylacetoxybutyl)acrylamide, N-(4-acetoacetoxymethyl-benzyl)acrylamide, N-(2-acetoacetylaminoethyl)acrylamide or 2-(N-acetoacetylaminoethyl)(meth)acrylate with an acrylic and/or nonacrylic monomer copolymerizable therewith. Examples of copolymerizable acrylic monomers include alkyl (meth)acrylates such as methyl, ethyl, propyl, n-butyl, isobutyl, t-butyl, 2-ethylhexyl or lauryl (meth)acrylate; hydroxyalkyl (meth)acrylates such as 2-hydroxyethyl (meth) acrylate; aryl or aralkyl (meth)acrylates such as phenyl or benzyl (meth) acrylate; PLACCEL FA1 or FM1 (adduct of 2-hydroxyethyl (meth)acrylate with polycaprolactone sold by Daicel Chemical Industries, Ltd.); and other acrylic monomers such as acrylamide, methylene-bis-acrylamide or acrylonitrile. Examples of copolymerizable non-acrylic monomers include styrene, α-methylstyrene, itaconic acid, maleic acid, vinyl acetate and the like.

A minor proportion of a polyfunctional monomer such as divinylbenzene or polyhydric alcohol poly(meth)acrylate esters may be incorporated into the monomer mixture. This results in internal crosslinking of the resulting copolymer which, in turn, increases the crosslinking density of finished films or permits the use of correspondingly decreased proportions of the activated methylene monomer to reach at a desired level of crosslinking density in the finished films.

For use as a water-based coating composition, the monomer mixture is emulsion-copolymerized using a conventional emulsifier and a polymerization initiator. Any of conventional anionic, cationic, nonionic and amphoteric surfactants may be used as emulsifier. Reactive emulsifiers for use emulsion polymerization are commercially available including "ANTOX MS-60" sold by Nippon Nyukazai Co., Ltd., "AQUARON HS-10" sold by Dai-Ichi Kogyo Seiyaku Co., Ltd. and "ADEKAREASOAP SE-10N" sold by Asahi Denka Kogyo K. K. These reactive emulsifiers may also be used. Water-soluble initiators such as potassium persulfate, ammonium persulfate, 4,4'-azobis(4-cyanovaleric acid), 2,2'-azobis(2-methylpropionamidine) dihydrochloride (V-50), 2,2'-azobis(N,N'-dimethyleneisobutyroamidine) (VA-061) and the like are used.

The activated methylene concentration of the resulting polymer is adjusted generally at 0.1 to 20 mmol/g solids. When high crosslinking densities are desired in the finished film, the activated methylene concentration should be at least 1 mmol/g solids.

Component (b)

Typical examples of component (b) are polyhydric alcohol acrylate or methacrylate esters such as ethylene glycol diacrylate or dimethacrylate, triethylene glycol dimethacrylate, tetraethylene glycol dimethacrylate, 1,3-butylene glycol dimethacrylate, trimethylolpropane diacrylate or dimethacrylate, 1,4-butanediol diacrylate, neopentyl glycol diacrylate or dimethacrylate, 1,6-hexanediol diacrylate or dimethacrylate, pentaerythritol dimethacrylate, pentaerythritol triacrylate, pentaerythritol trimethacrylate, pentaerythritol tetraacrylate or tetramethacrylate, glycerol diacrylate or dimethacrylate, acryloxyglycerol dimethacrylate, 1,1,1-trishydroxymethyl-ethane diacrylate or dimethacrylate, 1,1,1-trishydroxymethyl-ethane triacrylate or trimethacrylate, 1,1,1-trismethylolpropane diacrylate or dimethacrylate and the like. Other examples include polycarboxylic acid esters of polymerizable unsaturated alcohols such as diallyl terephthalate, diallyl phthalate and triallyl trimellitate; aromatic compounds having two or more vinyl groups such as divinylbenzene; and adducts of an epoxy group-containing monomer such as glycidyl acrylate or methacrylate with a carboxyl group-containing monomer such as acrylic, methacrylic, crotonic or maleic acid. Acrylates or methacrylates of polyol-ethylene oxide adduct such as triacrylate of trimethylolpropane-ethylene oxide adduct sold by Shin Nakamura Kagaku K. K. under the name of TMPTA-30E are an example of water-soluble component (b). Mixtures of these unsaturated compounds may also be used. For use as a component of water-based coating composition, component (b) is dissolved or emulsified or dispersed in an aqueous medium using a conventional emulsifier or dispersant.

Component (c)

A variety of catalysts which promote the Michael reaction are known in the art. Examples thereof include alkali metal hydroxides such as potassium hydroxide or sodium hydroxide, alkali metal carbonates such as potassium carbonate or sodium carbonate, quaternary ammonium compounds, amidines and guanidines. A variety of quaternary ammonium compounds may be used. Examples of ammonium cations include tetraalkylammonium, trialkylaralkylammonium, nitrogen-containing heterocyclic ammonium cations derived from pyridine, piperidine, piperazine or morpholine. Specific examples thereof are tetrabutylammonium, tetramethylammonium, tetraethylammonium, trimethylbenzylammonium, tetrapropylammonium, tetrahexylammonium, tetraoctylammonium, tetradecylammonium, tetrahexadecylammonium, triethylhexylammonium, 2-hydroxyethyltrimethylammonium(choline), methyltrioctylammonium, cetyltrimethylammonium, 2-chloroethyltrimethylammonium, methylpyridinium and the like.

Counter anions are preferably chosen from hydroxide, halides, carboxylates, sulfonates or sulfate. Specific examples thereof include hydroxide, acetate, laurate, glycolate, benzoate, salicylate, chloride, bromide, iodide, methanesulfonate, p-toluenesulfonate, dodecylbenzenesulfonate, triflate, nitrate, sulfate, methosulfate and the like. An epoxy compound may be used in combination with quaternary ammonium salts to promote their catalytic activity. Amidines, guanidines and tertiary amines may also be used as the component (c). When component (a) is produced by emulsion-polymerizing a monomer mixture using an amidine type initiator such as V-50 or VA-061, the amidine structure remained in the decomposed products of initiator may function as component (c).

Coating Composition

Component (a), component (b) and component (c) are blended together to form a one-pot composition and need not be kept separately. One of important advantages of the present invention resides in the fact that the composition is stable for a long period of time yet retaining curability or crosslinkability at room temperature.

The proportions of component (a) and component (b) in the coating composition are preferably such that the molar ratio of activated methylene to ethylenic unsaturation ranges between 3:1 and 1:3. Of course, the closer to stoichiometric proportions the more preferable. The amount of component (c) will vary depending upon the nature of particular catalyst used and generally ranges from 0.1 to 10% based on the combined weight of component (a) and component (b) as solids.

The coating composition of the present invention may contain a variety of conventional additives such as extender pigments, coloring pigments, organic solvents used for adjusting the film-forming property, surface smoothing agents, defoaming agents, viscosity adjusting agent and the like.

The following examples are intended to illustrate the present invention without limiting thereto. All parts and per cents therein are by weight unless otherwise specified.

Production Example 1

A flask equipped with a stirrer, reflux condenser and drip funnel was charged with 200 parts deionized water and 1.2 parts of ANTOX MS-60 (reactive emulsifier sold by Nippon Nyukazai K. K.) and the content was warmed to 80° C. To the flask were added dropwise over 2 hours a solution of 1.2 parts of potassium persulfate in 120 parts of deionized water and a pre-emulsified monomer mixture containing 280 parts of deionized water, 3.2 parts of ANTOX MS-60, 214 parts of acetoacetoxyethyl methacrylate, 40 parts of styrene, 76.4 parts of methyl methacrylate and 69.6 parts of 2-ethylhexyl acrylate. The content was then kept at 80° C. for 1 hour and finally adjusted at pH 7.5 with 60 parts of a 2.5% aqueous solution of tetramethylammonium hydroxide. An emulsion having a solid content of 38% and a particle size of 130 nm (as determined by the laser scattering method) was obtained.

Production Example 2

Production Example 1 was followed except that sodium hydroxide was used to adjust the pH of emulsion.

Production Example 3

Production Example 1 was followed except that dimethylethanolamine was used to adjust the pH of emulsion.

Production Example 4

Production Example 1 was followed except that an initiator solution containing 1.2 parts of azobiscyanovaleric acid and 0.78 parts of tetramethylammonium hydroxide in 120 parts of deionized water was used. An emulsion having 38% solids and 180 nm particle size was obtained.

Production Example 5

As a preliminary step, a cationic reactive emulsifier of 100% solids was produced from N,N-dimethylaminoethyl methacrylate and lauryl bromide.

The same flask as used in Production Example 1 was charged with 150 parts of deionized water and 3 parts of the above cationic reactive emulsifier and the content was heated to 80° C. To the flask were added dropwise over 2 hours a solution of 1.5 parts of V-50 (2,2'-azobis(2-methylpropionamidine) dihydrochloride, Wako Junyaku Co., Ltd.) in 90 parts of deionized water and a pre-emulsified monomer mixture containing 210 parts of deionized water, 12 parts of the above emulsifier 160.5 parts of acetoacetoxyethyl methacrylate, 30 parts of styrene, 57.3 parts of methyl methacrylate and 52.2 parts of 2-ethylhexyl acrylate. After the addition the content was maintained at 80° C. for 1 hour. An emulsion having 37% solids and 220 nm particle size was produced.

Production Examples 6–8

Production Example 1 was followed except that each of the following monomer mixtures was used.

| Monomer, parts | Pro. Ex. 6 | Pro. Ex. 7 | Pro. Ex. 8 |
| --- | --- | --- | --- |
| AAEM[1] | 42 | 8 | 8 |
| ST[2] | 40 | 40 | 40 |
| MMA[3] | 148.4 | 182.4 | 162.4 |
| 2-EHA[4] | 169.6 | 169.6 | 149.6 |
| EGDM[5] | — | — | 40 |

[1] Acetoacetoxyethyl methacrylate
[2] Styrene
[3] Methyl methacrylate
[4] 2-Ethylhexyl acrylate
[5] Ethylene glycol dimethacrylate Production Example 9

Production Example 1 was followed except that the monomer mixture contained 104 parts of acetoacetoxyethyl methacrylate, 64 parts of styrene 120 parts of methyl methacrylate and 112 parts of 2-ethylhexyl acrylate. An emulsion having 38% solids and 140 nm particle size was obtained.

Production Example 10

Production Example 1 was followed except that the monomer mixture contained 104 parts of acetoacetoxyethyl methacrylate, 64 parts of styrene, 120 parts of methyl methacrylate and 112 parts of 2-ethylhexyl acrylate, and that the emulsion was neutralized with 60 parts of a 7.1% aqueous solution of tetrabutylammonium hydroxide. An emulsion having 39% solids and 140 nm particle sized was obtained.

Production Example 11 (solvent type resin varnish for comparision)

240 parts of methoxypropanol were placed in the same flask as used in Production Example 1 and then heated to 110° C. To this was added dropwise over 3 hours a mixture of 152.6 parts of acetoacetoxyethyl methacrylate, 154.6 parts of methyl methacrylate, 92.9 parts of 2-ethylhexyl acrylate and 2 parts of KAYAESTER 0 (t-butyl peroctoate sold by Kayaku Akzo Co., Ltd.). After keeping the content at 110° C. for 1 hour, a solution of 2 parts of KAYAESTER O in 18 parts of methoxypropanol was added to the flask. Again the content was kept at 110° C. for additional 90 minutes whereupon a resin varnish of 62% solids having a number average molecular weight of 5,000 (as determined by the GPC method) was produced.

Production Example 12 (resin emulsion for comparison)

The same flask as used in Production Example 1 was charged with 68 parts of deionized water and 1.6 parts of KOTAMIN 86P CONC (cationic emulsifier sold by Kao Corporation) and the content was warmed to 80° C. To this were added dropwise over 2 hours a solution of 0.5 parts of V-50 in 90 parts of deionized water and a pre-emulsified monomer mixture containing 100 parts of deionized water, 3 parts of KOTAMIN 86P CONC, 40 parts of diacetoneacrylamide, 16 parts of styrene and 44 parts of 2-ethylhexyl acrylate. After the addition, the content was maintained at 80° C. for 1 hour. An emulsion having 28% solids and 230 nm particle size was produced.

Production Example 13

60 parts of trimethylpropane triacrylate (TMPTA) were dispersed in 10 parts of a 10% aqueous solution of polyvinyl alcohol and 30 parts of deionized water to obtain an aqueous dispersion of TMPTA at a concentration of 60%.

Production Example 14

A polymeric dispersant was produced by solution polymerizing a mixture of 816 parts of ethoxypropanol, 61.2 parts of acrylic acid, 438 parts of methyl methacrylate, 460.8 parts of 2-ethylhexyl acrylate, 240 parts of styrene and 21.6 parts of KAYAESTER O. The dispersant had a solids content of 60% and an acid number of 40.

105 parts of TMPTA were blended with 75 parts of the above dispersant and 11.4 parts of a 25% aqueous solution of tetramethylammonium hydroxide and then diluted with 258 parts of deionized water to obtain an aqueous dispersion of TMPTA at a concentration of 23%.

Production Example 15 (hydrazide hardener)

174.2 parts of dimethyl adipate were reacted with 100.1 parts of hydrazine hydrate in 224 parts of deionized water for 10 hours at 80° C. to produce adipic acid dihydrazide.

Production Example 16 (pigment dispersion)

A 25% pigment dispersant resin solution was produced by neutralizing SMA-1440 (pigment dispersant resin sold by ATOCHEM, acid number 180) with a stoichiometric amount of tetramethylammonium hydroxide.

10 parts of this solution were kneaded with 100 parts of titanium dioxide and then diluted with 33 parts of deionized water to obtain a pigment dispersion having a pigment concentration of 70%.

Production Example 17

Production Example 16 was followed except that the pigment dispersant resin was neutralized with an equivalent amount of tetrabutylammonium hydroxide to produced a pigment dispersion containing titanium dioxide at a concentration of 70%.

Example 1

A clear coating composition was produced by blending 26.4 parts of the emulsion by Production Example 1 with 4.2 parts of the TMPTA dispersion of Production Example 13. This composition was applied on a glass plate using an 8 mill doctor blade and allowed to cure at room temperature for one week. The resulting film was subjected to methyl ethyl ketone (MEK) rubbing test at 20 and 50 reciprocations.

The composition was also tested for storage stability at 40° C. After one month no change was observed in the properties of the composition including the performance of cured film in the MEK rubbing test at 20 reciprocations. The results are shown in Table 1.

Examples 2–10

Various clear coating compositions were prepared as in Example 1 according to the formulations shown in Table 1 and tested for solvent resistance and storage stability. The results are shown in Table 1.

TABLE 1

| | EXAMPLE | | | | | | | | | |
|---|---|---|---|---|---|---|---|---|---|---|
| | 1 | 2 | 3 | 4 | 5 | 6 | 7 | 8 | 9 | 10 |
| Component (a), parts | | | | | | | | | | |
| Pro. Ex. 1 | 26.4 | 26.4 | 26.4 | | 26.4 | | | | | |
| Pro. Ex. 2 | | | | 26.4 | | | | | | |
| Pro. Ex. 4 | | | | | | 26.4 | | | | |
| Pro. Ex. 5 | | | | | | | 26.4 | | | |
| Pro. Ex. 6 | | | | | | | | 26.4 | | |
| Pro. Ex. 7 | | | | | | | | | 26.4 | |
| Pro. Ex. 8 | | | | | | | | | | 26.4 |
| Component (b), parts | | | | | | | | | | |
| Pro. Ex. 13 | 4.2 | 2.1 | | 4.2 | | 4.2 | 4.2 | 0.9 | 0.2 | 0.2 |
| Pro. Ex. 14 | | | | | 11 | | | | | |
| TMPTA-30E[1] | | | 14 | | | | | | | |
| MEK rubbing test | | | | | | | | | | |
| x30 | No Change | " | " | " | " | " | " | " | " | " |
| x50 | No Change | " | " | " | " | " | " | Slightly swelled | No Change | " |
| Storage stability[2] at 40° C. for 1 mon. | No Change | " | " | " | " | " | " | " | " | " |

[1]Triacrylate of trimethylolpropane-ethylene oxide adduct sold by Shin Nakamura Kagaku K.K.
[2]Each coating composition was poured into a paint can up to 8/10 depth and placed in an atmosphere at 40° C. after closing the can to prevent evaporation.

Example 11

A dispersion of an epoxy compound was produced by dispersing 60 parts of diglycidyl phthalate in 10 parts of a 10% aqueous solution of polyvinyl alcohol and 30 parts of deionized water.

Analogous to Example 1, a clear coating composition was prepared by blending 26.4 parts of the emulsion of Production Example 3, 4.2 parts of the TMPTA dispersion of Production Example 13, 1.6 parts of a 5% aqueous solution of tetramethylammonium hydroxide and 1.4 parts of the above epoxide dispersion. The composition exhibited satisfactory results in the storage stability and MEK rubbing test.

Example 12

An enamel was produced by blending 26.4 parts of the emulsion of Production Example 1, 4.2 parts of the TMPTA dispersion of Production Example 13 and 15 parts of the pigment dispersion of Production Example 16, and tested for solvent resistance and storage stability as in Example 1. The results were satisfactory.

Example 13

An enamel was produced by blending 26.4 parts of the emulsion of Production Example 9, 4.2 parts of the TMPTA dispersion of Production Example 13 and 15 parts of the pigment dispersion of Production Example 16, and tested for solvent resistance and storage stubility as in Example 1. The results were satisfactory.

Example 14

An enamel was produced by blending 26.4 parts of the emulsion of Production Example 10, 4.2 parts of the TMPTA emulsion of Production Example 13 and 15 parts of the pigment dispersion of Production Example 17, and tested for solvent resistance and storage stability as in Example 1. The results were satisfactory.

Comparative Example 1

An air drying, non-crosslinking, acrylic emulsion paint (SAIBINOL sold by Saiden Chemical Co., Ltd.) was applied on a glass plate and dried at room temperature for one week. In the MEK rubbing test the film was dissloved to expose the glass substrate. The paint was stable upon storage at 40° C. for one month.

Comparative Example 2

A clear coating composition was produced by blending 16.6 parts of the varnish of Production Example 11, 2.5 parts of TMPTA and 1 part of a 3% aqueous solution of tetramethylammonium hydroxide. This composition was applied on a glass plate using an 8 mill doctor blade and allowed to cure at room temperature for one week. The cured film showed no change in the MEK rubbing test but the composition itself began to gel upon standing for 1 hour at room temperature.

Comparative Example 3

Example 1 was repeated except that tetramethylammonium hydroxide was not added to the emulsion of Production Example 1. The film was dissolved in the MEK rubbing test to expose the glass substrate. The composition was stable in the storage stability test.

Comparative Example 4

A clear coating composition was produced by blending the emulsion of Production Example 12 and the hydrazide hardener of Production Example 15 in a stoichiometric ratio relative to carbonyl and hydrazide groups. The composition was tested as in Example 1. A slight trace was observed in the MEK rubbing test. The composition itself began to gel upon storage at room temperature for 2 days.

We claim:

1. A water-based, room-temperature curable coating composition comprising (a) an aqueous emulsion of an acrylic copolymer having a plurality of activated methylene groups in the molecule produced by emulsion polymerizing a mixture of an acrylic monomer having an activated methylene group and an ethylenically unsaturated monomer copolymerizable therewith free from said activated methylene group, (b) an aqueous solution or dispersion of a compound having a plurality of ethylenic unsaturations in the molecule which is an acrylic or methacrylic acid ester of an aliphatic polyol, an acrylic or methacrylic acid ester of an ethylene oxide-adduct of an aliphatic polyol or a mixture thereof, and (c) a catalyst capable of catalyzing the Michael reaction between said component (a) and said component (b).

2. The composition of claim 1 wherein said acrylic monomer is 2-acetoacetoxyethyl (meth)acrylate, 2-cyanoacetoxyethyl (meth)acrylate, N-(2-cyanoacetoxyethyl) acrylamide, N-(2-propionylacetoxybutyl)acrylamide, N-(4-acetoacetoxymethylbenzyl)acrylamide, N-(2-acetoacetylaminoethyl)acrylamide or 2-(N-cyanoacetylamino)ethyl (meth) acrylate.

3. The composition of claim 1 wherein said acrylic copolymer contains the activated methylene groups at a concentration of at least 0.1 mmol/g solids.

4. The composition of claim 1 wherein the proportions of said component (a) and said component (b) are such that the molar ratio of activated methylene groups to ethylenic unsaturations ranges between 3:1 and 1:3.

5. The composition of claim 1 wherein said catalyst is an inorganic or organic strong base.

6. The composition of claim 1 wherein said catalyst is a quaternary ammonium base or salt.

7. The composition of claim 1 wherein said catalyst is a combination of a quaternary ammonium salt and an epoxide compound.

8. The composition of claim 1 wherein the amount of said catalyst is from 0.1 to 10% based on the combined weight of said component (a) and said component (b) as solids.

9. The composition of claim 1, which exhibits stability upon storage for at least one month at 40° C.

10. The composition of claim 1, wherein the mixture emulsion polymerized to produce aqueous emulsion (a) further contains divinylbenzene or a polyhydric alcohol poly(meth)acrylate ester.

11. The composition of claim 1, wherein (b) is an aqueous solution or dispersion of ethylene glycol diacrylate or dimethacrylate, triethylene glycol dimethacrylate, tetraethylene glycol dimethacrylate, 1,3-butylene glycol dimethacrylate, trimethylolpropane diacrylate or dimethacrylate, 1,4-butanediol diacrylate, neopentyl glycol diacrylate or dimethacrylate, 1,6-hexanediol diacrylate or dimethacrylate, pentaerythritol dimethacrylate, pentaerythritol triacrylate, pentaerythritol trimethacrylate, pentaerythritol tetraacrylate or tetramethacrylate, glycerol diacrylate or dimethacrylate, acryloxyglycerol dimethacrylate, 1,1,1-trishydroxymethyl-ethane diacrylate or dimethyacrylate, 1,1,1-trishydroxymethyl-ethane triacrylate or trimethacrylate, 1,1,1-trismethylolpropane diacrylate or dimethacrylate, triacrylate of trimethylolpropane-ethylene oxide adduct or a mixture thereof.

12. A water-based, room-temperature curable coating composition produced by mixing (a) an aqueous emulsion of an acrylic copolymer having a plurality of activated methylene groups in the molecule produced by emulsion polymerizing a mixture of an acrylic monomer having an activated methylene group and an ethylenically unsaturated monomer copolymerizable therewith free from said activated methylene group, (b) an aqueous solution or dispersion of a compound having a plurality of ethylenic unsaturations in the molecule which is an acrylic or methacrylic acid ester of an aliphatic polyol, an acrylic or methacrylic acid ester of an ethylene oxide-adduct of an aliphatic polyol, and (c) a catalyst capable of catalyzing the Michael reaction between said component (a) and said component (b).

* * * * *